(12) United States Patent
Wacker et al.

(10) Patent No.: US 12,341,456 B2
(45) Date of Patent: Jun. 24, 2025

(54) METHOD FOR OPERATING A DRIVE SYSTEM, AND DRIVE SYSTEM

(71) Applicant: SEW-EURODRIVE GMBH & CO. KG, Bruchsal (DE)

(72) Inventors: Maik Wacker, Östringen (DE); Marcel Stark, Meckesheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 172 days.

(21) Appl. No.: 18/479,210

(22) Filed: Oct. 2, 2023

(65) Prior Publication Data

US 2024/0030855 A1 Jan. 25, 2024

Related U.S. Application Data

(63) Continuation of application No. 17/250,523, filed as application No. PCT/EP2019/025239 on Jul. 19, 2019, now Pat. No. 11,777,434.

(30) Foreign Application Priority Data

Jul. 30, 2018 (DE) .......................... 102018005932.5

(51) Int. Cl.
*H02P 27/06* (2006.01)
*H02M 5/458* (2006.01)
*H02M 7/797* (2006.01)

(52) U.S. Cl.
CPC .......... *H02P 27/06* (2013.01); *H02M 5/4585* (2013.01); *H02M 7/797* (2013.01)

(58) Field of Classification Search
CPC ........ H02P 27/06; H02P 27/08; H02P 27/085; H02P 27/04; H02P 2201/13;
(Continued)

(56) References Cited

U.S. PATENT DOCUMENTS

| 4,904,918 A | 2/1990 | Bailey et al. |
| 2006/0092057 A1 | 5/2006 | Slavin |

(Continued)

FOREIGN PATENT DOCUMENTS

| CN | 103259490 A | 8/2013 |
| DE | 102004023314 A1 | 12/2005 |

(Continued)

OTHER PUBLICATIONS

"Nozaki Yuichiro, Traction Power Converter for Multisystem Rail Vehicle, Feb. 12, 2014, Clarivate Analytics, pp. 1-28." (Year: 2014).*

(Continued)

*Primary Examiner* — Antony M Paul
(74) *Attorney, Agent, or Firm* — Carter, DeLuca & Farrell LLP

(57) ABSTRACT

In a method for operating a drive system, and drive system, having a rectifier and at least one inverter including an electric motor, the electric motor is connected at the AC-voltage-side connection of the inverter, the DC-voltage-side connection of the inverter is connected via inductance(s) in addition to the line inductance, to the DC-voltage-side connection of the rectifier, a capacitance is connected at the DC-voltage-side connection of the inverter and/or at the DC-voltage-side connection of the rectifier, a series circuit, including a resistor and a controllable semiconductor switch is connected at the DC-voltage-side connection of the inverter and/or at the DC-voltage-side connection of the rectifier, the braking chopper being operated using a single frequency during the particular time span in which the braking chopper is in operation, the frequency, e.g., being set apart from the resonant frequency of the resonant circuit including the inductance or the capacitances.

21 Claims, 5 Drawing Sheets

(58) Field of Classification Search
CPC .............. H02P 2201/01; H02P 2201/03; H02P 2201/076; H02P 23/28; H02P 21/36; H02P 3/12; H02P 3/14; H02P 3/26; H02P 3/22; H02P 3/18; H02P 1/52; H02P 1/46; H02P 5/74; H02P 23/04; H02P 29/50; H02M 5/4585; H02M 7/797; H02M 1/008; H02M 1/12; B60L 2200/26; B60L 2210/40; B60L 2220/12; B60L 2220/14; B60L 50/51; B60L 7/02; B60L 7/06; B60L 7/14; B60L 7/22

See application file for complete search history.

(56) References Cited

U.S. PATENT DOCUMENTS

| | | |
|---|---|---|
| 2009/0251081 A1 | 10/2009 | Thunes et al. |
| 2010/0332065 A1 | 12/2010 | Lin et al. |

FOREIGN PATENT DOCUMENTS

| | | | |
|---|---|---|---|
| DE | 102012020578 A1 | 4/2014 | |
| EP | 2112760 A1 | 10/2009 | |
| EP | 2631104 A1 | 8/2013 | |
| EP | 2695763 A2 * | 2/2014 | ................ B60L 1/10 |

OTHER PUBLICATIONS

International Search Report issued in corresponding International Application No. PCT/EP2019/025239, dated Sep. 27, 2019, pp. 1-2, English Translation.

Office Action issued by the European Patent Office in corresponding EP Patent Application No. 19748663.2, dated Nov. 24, 2022, pp. 1-10, with English Translation.

* cited by examiner

METHOD FOR OPERATING A DRIVE SYSTEM, AND DRIVE SYSTEM

CROSS-REFERENCE TO RELATED APPLICATIONS

The present application is a continuation of U.S. patent application Ser. No. 17/250,523, which is the national stage of PCT/EP2019/025239, having an international filing date of Jul. 19, 2019, and claims priority to Application No. 102018005932.5, filed in the Federal Republic of Germany on Jul. 30, 2018, each of which is expressly incorporated herein in its entirety by reference thereto.

FIELD OF THE INVENTION

The present invention relates to a method for operating a drive system and to a drive system.

BACKGROUND INFORMATION

Certain conventional electric motors can be operated as a generator or a motor, and the voltage at the DC-voltage-side connection of an inverter supplying the electric motor rises in a generator-mode operation if a capacitor is connected at this connection.

SUMMARY

Example embodiments of the present invention provide a drive system that can be operated in a safe manner.

According to example embodiments of the present invention, in a method for operating a drive system having a rectifier and at least one inverter with an electric motor, the electric motor is connected at the AC-voltage-side connection of the inverter, the DC-voltage-side connection of the inverter is connected to the DC-voltage-side connection of the rectifier via at least one inductance in addition to the line inductance, a capacitance, in particular, a non-polar capacitor, in particular, a film capacitor, is connected at the DC-voltage-side connection of the inverter and/or at the DC-voltage-side connection of the rectifier, a series circuit, that includes a resistor and a controllable semiconductor switch, i.e., a braking chopper, is connected at the DC-voltage-side connection of the inverter and/or at the DC-voltage-side connection of the rectifier, and the braking chopper is operated using a single frequency f during the particular time span in which the braking chopper is in operation, the frequency, in particular, being spaced apart from the resonant frequency of the resonant circuit including the inductances and the capacitance or capacitances.

This has the advantage that the frequency is able to be spaced apart from a resonant frequency of the drive system. The excitation of oscillations is therefore avoidable and the drive system may consequently be operated in a safe manner, in particular, in terms of the voltage. This is considered advantageous, in particular, when multiple inverters are jointly supplied from a DC-voltage circuit, in particular, an intermediate circuit. Of importance in this context is the interaction of the inductances with the capacitance(s) for forming a system that has a resonant frequency.

According to example embodiments, the voltage supplying the series connection, and thus the intermediate circuit voltage, i.e., in particular, the voltage applied at the DC-voltage-side connection of the inverter, is acquired. This offers the advantage that the operation of the braking chopper is able to be carried out in a voltage-dependent manner.

The actuating signal for the braking chopper may thus be generated by a control electronics, the actuating signal being able to be generated as a function of the intermediate-circuit voltage on the one hand and as a function of a controllable time basis on the other hand.

According to example embodiments, the acquired value of the voltage, i.e., the intermediate circuit voltage, is digitized and conveyed as a digital serial data stream to a first digital filter, in particular, an FIR filter, on the one hand, and to a second digital filter, in particular, an FIR filter, on the other hand, the second digital filter being started at a time offset from the first digital filter, the time offset, in particular, amounting to one half of the filter length. This offers the advantage that the dead time can be reduced in that the digital data stream is able to be evaluated at a more rapid repeat rate.

According to example embodiments, the output signals of both filters are conveyed to a comparison device for a comparison with the first and the second threshold value in each case, the output signals of the comparison device being logically linked with a signal generated by a controllable time basis, in particular, by a controllable clock generator, for the generation of an actuating signal for the braking chopper. This has the advantage that a voltage-dependent condition is able to be linked with a time-dependent condition. The actuating signal for the braking chopper is therefore able to be generated such that the braking chopper can be operated using a fixed frequency, in particular, a single fixed frequency, whenever the intermediate circuit voltage lies in the value range provided for this purpose. The compliance with the time-dependent condition ensures that the braking chopper is activated at the clock pulse of the frequency and that the braking chopper is deactivated at the clock pulse of the frequency. However, the operation is always conducted subject to the caveat that the voltage lies in the provided range since the braking chopper will otherwise remain switched off.

According to example embodiments, the braking chopper is deactivated whenever the intermediate circuit voltage drops below a threshold value U2. This is considered advantageous insofar as the intermediate circuit voltage does not drop to an unintentionally low value on account of the braking chopper.

According to example embodiments, the braking chopper is activated when the intermediate circuit voltage exceeds a first threshold value U1, in particular, and when either no activation has had previously taken place, or the most recent activation to have previously taken place was earlier by more than a predefined time period T, time period T being equal to the multiplicative inverse of frequency f. This has the advantage that the braking chopper may be activated after U1 has been exceeded, but only if the braking chopper is activated for the first time or is reactivated for time-related reasons after an interruption of its operation. However, the interruption must have lasted longer than the multiplicative inverse of the frequency and the intermediate circuit voltage must be greater than threshold value U2.

According to example embodiments, first switching threshold U1 is greater than second switching threshold U2. This has the advantage that U1 functions as an activation threshold, and U2 functions as a deactivation threshold.

According to example embodiments, following the activation of the braking chopper, a deactivation of the braking chopper is carried out after, especially no later than, a time period whose value is equal to a product ($q \times T$) of a time period T and a factor q, the factor q having a value of between zero and one, in particular, a value from the range of 0.8 to 0.98.

This corresponds to the maximal duration of the activation of the braking chopper within period T. The result is a forced deactivation. This similarly also applies in the reverse case so that the forced activation if previously maximally deactivated.

This offers the advantage that in order to maintain the frequency, the deactivation is forced even when the intermediate circuit voltage is actually so high that the intermediate circuit voltage should be lowered, i.e., energy of the intermediate circuit should be converted into heat via the braking chopper and the resistor switched in series and functioning as brake resistor. It is therefore actually disadvantageous to require the braking chopper to adhere to the frequency, but it prevents the excitation of resonant oscillations. The braking chopper is operable, e.g., at the actuation limit. It is then activated for maximally 0.98×T and deactivated 0.02×T instead of a permanent activation. This loss in actuating reserves is taken into account during the configuration of the brake resistor and does not constitute a disadvantage.

According to example embodiments, the multiplicative inverse of time period T is greater than the resonant frequency of the resonant circuit including the inductances and the capacitance or capacitances. This offers the advantage that the frequency is able to be spaced apart from the resonant frequency, in particular, by more than 40% of the value of the resonant frequency.

According to example embodiments, if the activation threshold U1 had been exceeded or reached at least once in the past and intermediate circuit voltage U_ZK lies above U2, the braking chopper is deactivated if the time interval from the previously undertaken deactivation reaches a time interval whose value is equal to a product (p×T) of a time period T and a factor p, factor p having a value of between zero and one, in particular, a value in the range from 0.8 to 0.98.

This has the advantage that the braking chopper is deactivated in a timely manner so that the frequency is still maintained.

According to example embodiments, if activation threshold U1 had been exceeded or reached at least once in the past and the intermediate circuit voltage U_ZK lies above U2, the braking chopper is activated if the time interval from the previously undertaken deactivation reaches a time interval whose value is equal to a product (q×T) of a time period T and a factor q, the factor q having a value of between zero and one, in particular, a value from the range of 0.8 to 0.98. This offers the advantage that the braking chopper is activated in a timely manner so that the frequency is still maintained.

According to example embodiments, factor q is equal to factor p. This offers the advantage that the activation frequency and the deactivation frequency are similar and therefore no additional excitation of beat frequencies and their harmonics takes place.

According to example embodiments, the acquired value of the voltage, i.e., the intermediate circuit voltage, is acquired, digitized, and conveyed as a digital serial data stream to a first digital filter, in particular, an FIR filter, on the one hand, and to a second digital filter, in particular, an FIR filter on the other hand, the second digital filter being started at a time offset from the first digital filter, the time offset, in particular, amounting to one half of a filter length.

This offers the advantage that the exceeding or undershooting of the threshold values is able to be detected more rapidly.

According to example embodiments, the output signals of both filters are conveyed to a comparison device for a comparison with the first and the second threshold value, the output signals of the comparison device being logically linked with a signal generated by a controllable time basis, in particular, by a controllable clock generator, for the generation of an actuating signal for the braking chopper. This has the advantage that the voltage-dependent condition is linkable with a time-dependent condition.

According to example embodiment of the present invention, in a drive system for carrying out a previously mentioned method, the additional inductance is at least ten times, in particular, at least one hundred times, greater than the line inductance. This is considered advantageous insofar as the resonant frequency is substantially independent of the line inductance. In this manner, the additional inductance may be dimensioned so that the resonant frequency lies in a predefined value range, and the frequency for operating the braking chopper has a sufficient clearance from this resonant frequency.

Further features and aspects of example embodiments of the present invention are described in greater detail below with reference to the appended schematic Figures.

DETAILED DESCRIPTION

Figure 1:
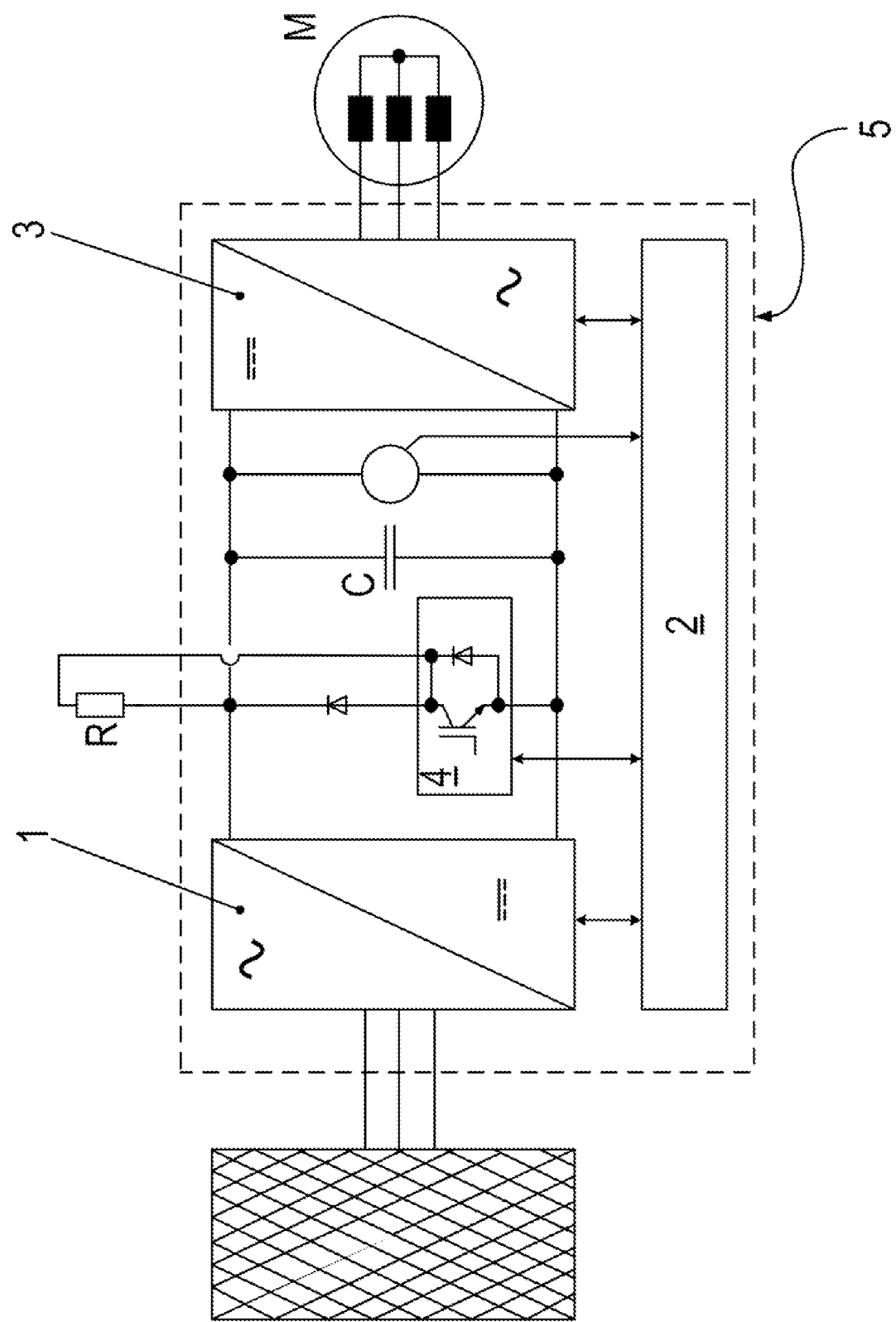
FIG. 1 schematically illustrates the structure of an inverter including a braking chopper.

As schematically illustrated in FIG. 1, an inverter has a rectifier 1, which may also be arranged as a regenerative rectifier. On the DC-voltage side, a capacitance C is provided at rectifier 1 which, however, is implemented only as a non-polar capacitor, in particular, as a film capacitor.

The voltage applied at capacitor C is acquired and conveyed to a signal electronics 1, which generates the actuating signals for the controllable semiconductor switches disposed in the form of half bridges.

Fed from the AC-voltage-side connection of the inverter is an electric motor M, in particular, a three-phase motor.

The voltage applied at capacitor C is conveyed to the DC-voltage-side connection of the inverter.

To protect against excess voltages at capacitor C, that is to say, to protect against an excess intermediate circuit voltage, a series circuit that includes a brake resistor R and a controllable semiconductor switch 4 is provided, freewheeling diodes also being provided.

The use of such a braking chopper therefore makes it possible to convert energy from the intermediate circuit into heat with the aid of the brake resistor, i.e., a brake resistor substantially arranged as an Ohmic resistor. In this manner, excess, system-critical voltage values are avoidable.

The actuating signal for semiconductor switch 4 is generated by signal electronics 2, to which the acquired intermediate circuit voltage values are conveyed as well.

Rectifier 1 is connected via its AC-voltage-side connection to the AC-voltage supply network.

Rectifier 1 is also implementable as a regenerative AC/DC converter.

Figure 2:
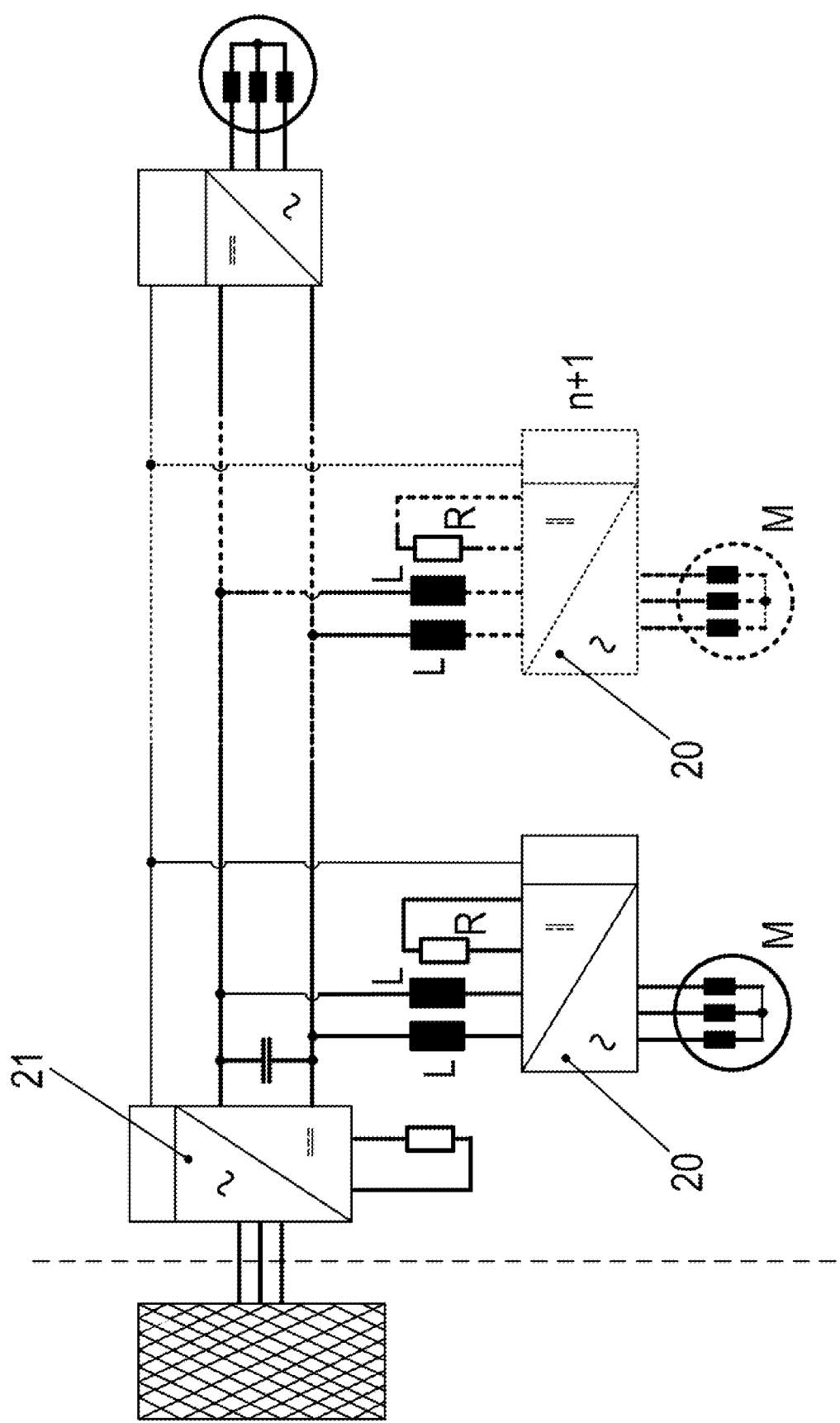
FIG. 2 schematically illustrates a drive system according to an example embodiment of the present invention.

As illustrated in FIG. 2, multiple inverters are able to be connected to the intermediate circuit via additional inductances L, so that energy is withdrawn from the intermediate circuit during the motoric operation of the electric motor, in particular, the three-phase motor, fed by the respective inverter 20, and energy is supplied in the generator-mode operation.

A braking chopper including brake resistor R is also allocated to each inverter 20.

Capacitance C_ZK may be arranged as a non-polar capacitor, in particular, as a film capacitor.

However, only a single brake resistor has to be connected to an inverter for the safe operation of the drive system including multiple inverters. The braking choppers of the other inverters may remain open.

As an alternative, a capacitance C_ZK is connected in each inverter 20 at its respective DC-voltage-side connection, to which a series circuit including a respective controllable semiconductor switch, in particular, a braking chopper, and a resistor, in particular, a brake resistor, are switched in parallel. On the one hand, the upper potential of the DC-voltage-side connection of inverter 20 is connected via an inductance L to the upper potential of intermediate circuit voltage U_ZK. On the other hand, the lower potential of the DC-voltage-side connection of inverter 20 is connected via an inductance L to the lower potential of intermediate circuit voltage U_ZK.

The intermediate circuit voltage in turn is generated using a network-supplied rectifier 21 at whose DC-voltage-side connection a non-polar capacitor is situated.

Figure 5:
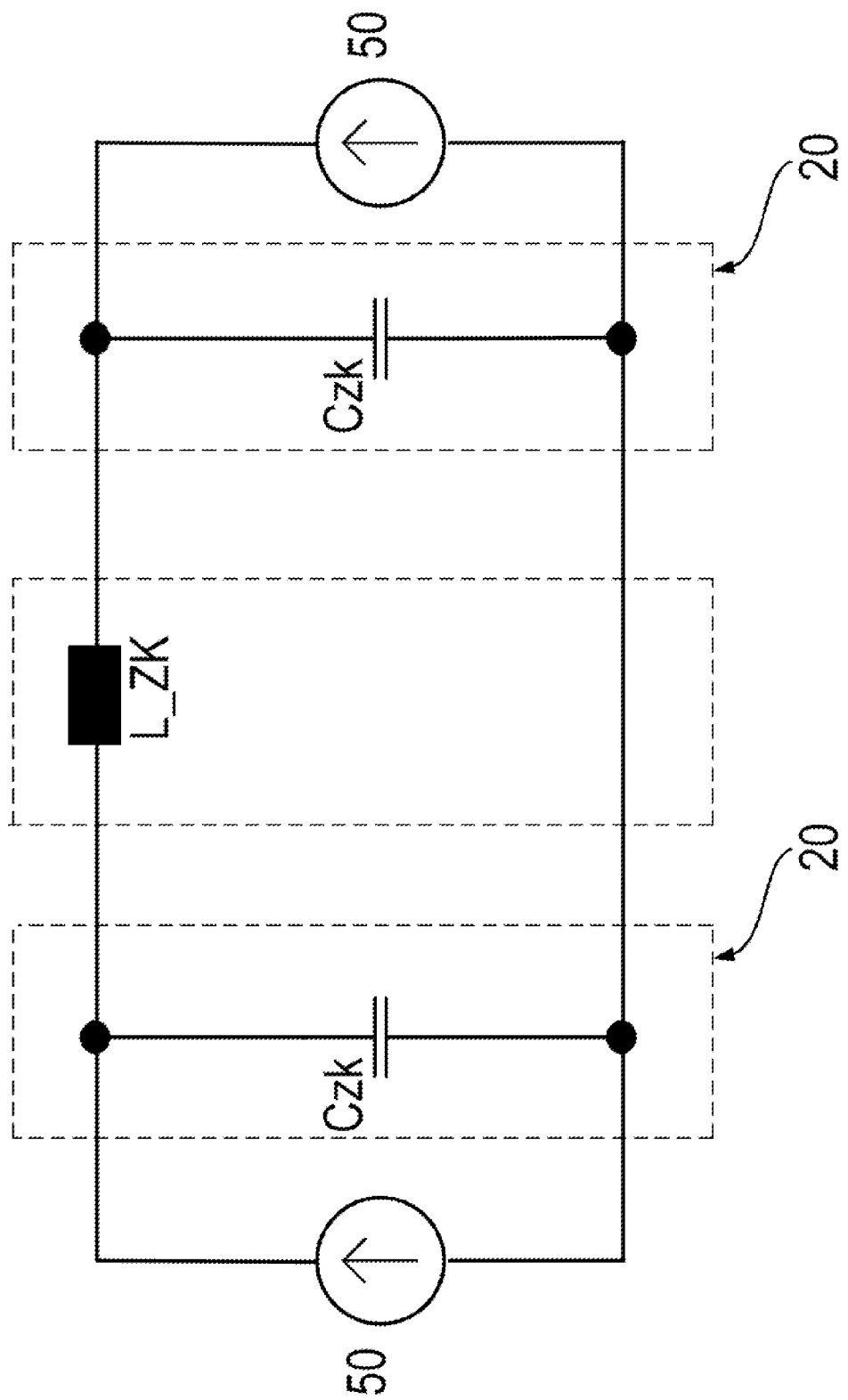
FIG. 5 schematically illustrates the oscillating circuit which—in the absence of additional intermediate circuit inductances L—is formed from the line inductance and intermediate-circuit-side capacitances C_ZK.

As illustrated in FIG. 5, capacitances C_ZK of the inverters would thus be connected via line inductance L_ZK if the additional inductances were not available. Inverters 20 would therefore introduce into the drive system excitations 50 which excite oscillations of the oscillating circuit that includes capacitances C_ZK and line inductance L.

However, since inductances L illustrated in FIG. 2 are provided in addition, which are at least ten times greater than the line inductances L_ZK of the intermediate circuit, the resonant frequency is thus able to be accurately brought to an intended value range, e.g., 2 kHz, with a deviation of less than 10%.

According to example embodiments of the present invention, the braking chopper is operated at a frequency of 3 kHz, in particular, at a system voltage of 400V to 500V, so that the braking chopper is unable to excite any oscillation of the resonant circuit. Since the pulse-width modulation frequencies of the controllable semiconductor switches of the inverters are also operated at a frequency above the value range, for example, at 4 kHz, 8 kHz, or 16 kHz, these inverters are likewise unable to excite an oscillation of the resonant circuit.

At a lower system voltage such as 200 Volt to 240 Volt, it is also possible to select 5 kHz as the frequency, for example.

Figure 3:
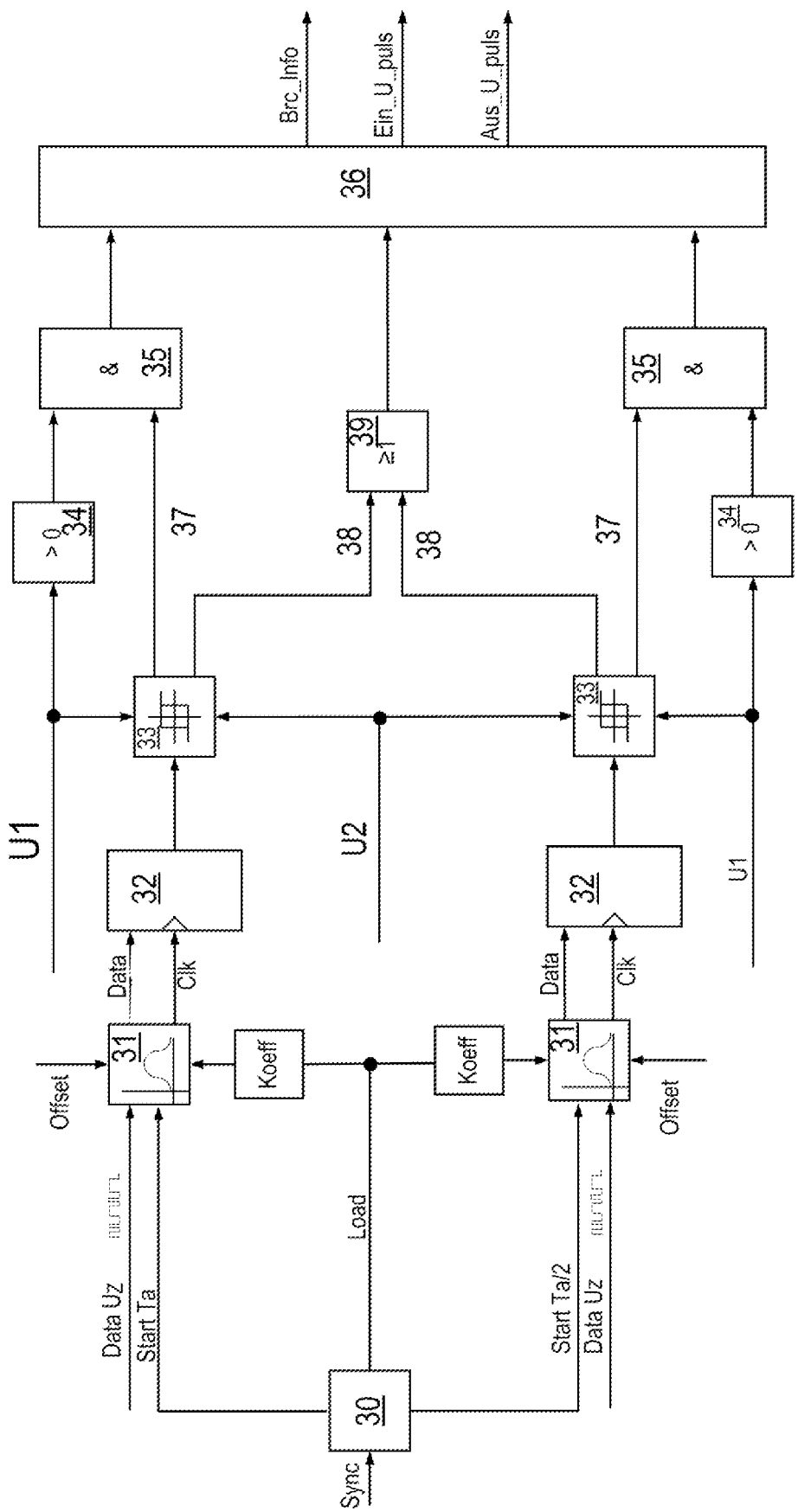
FIG. 3 schematically illustrates the generation of signals as a function of the intermediate circuit voltage.
Figure 4:
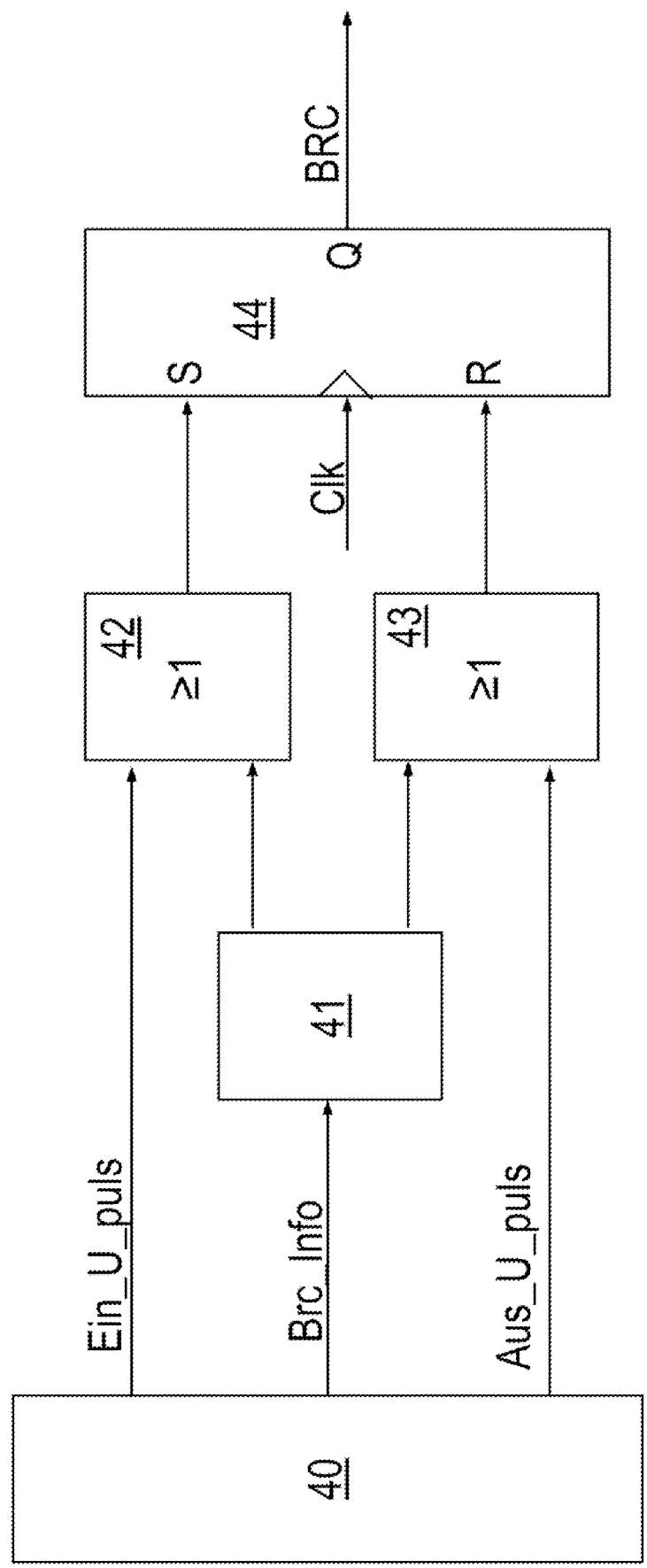
FIG. 4 schematically illustrates the generation of the actuating signal, carried out as a function of the signals, for the braking chopper.

The operating method and operating conditions of the braking chopper are described in greater detail with reference to FIGS. 3 and 4, FIG. 3 schematically illustrating the voltage-dependent conditions, and FIG. 4 schematically illustrating the time-dependent conditions for the actuation of the braking chopper.

As illustrated in FIG. 3, the acquired intermediate circuit voltage, which is converted into a serial digital data stream with the aid of a delta-sigma converter, is conveyed to two digital filters 31, in particular, FIR filters, whose respective start signals are mutually offset in time by one half of a filter length Ta/2. The start signals are generated by a time basis 30 to which a synchronization signal is transmitted.

The digital filters 31 are arranged as a digital low-pass filter, that is to say, in particular, with a damping power that has a window-type dependency on the frequency.

The output signal of filters 31 is conveyed to a respective serial-parallel converter 32, whose digital parallel output signal is forwarded to a respective comparator 33 in each case, which compares the output signal, i.e., the acquired respective voltage value, to a first threshold value U1 and to a second voltage value U2.

First threshold value U1 corresponds to a minimally required voltage for inducing an activation if the braking chopper had previously been deactivated. Second threshold value U2 marks a voltage which, if undershot, always causes the braking chopper to be deactivated.

The result of the comparison with first threshold value U1 is output on a signal line 37.

The result of the comparison with second threshold value U2 is output on a second signal line 38, which is routed to a linking device 39.

In a voltage monitoring device 34, it is checked whether first threshold value U1 is greater than zero, and if this is not the case, a deactivation of the drive system is initiated when negative voltages are detected, or the drive system is brought to a safe state.

To this end, first signal line 37 leads from respective comparator 33 to a respective AND-conjunction 35 with the respective result of the monitoring of first threshold value U1, i.e., with the output signal of the voltage monitoring device 34 for the deactivation upon the detection of negative voltages.

Comparator 33 is configured to take a hysteresis into account in the respective comparison.

Linkage device 39 links the two signals on both signal lines 38 to a 2-bit item of information, which is forwarded as BRC_Info. In the process, the item of information is therefore encoded as to whether both signals are zero or whether at least one of the two signals is unequal to zero or whether both signals are unequal to zero. Thus, it is encoded whether the intermediate circuit voltage is greater than the activation threshold, is lower than the deactivation threshold, or lies between the two threshold values.

The output signals of the AND-conjunctions 35 are conveyed to signal generation device 36, just like the output signal of linkage device 39. This signal generation device 36 thus supplies the aforementioned signal BRC_Info and a signal Ein_U-puls, which is set when threshold value U1 is exceeded and is reset when it is undershot.

Because of the dual voltage processing at a time offset of one half of a filter time according to FIG. 3, a more rapid detection of the exceeding or of an undershooting of the threshold values (U1, U2) is possible.

As illustrated in FIG. 4, signal BRC_Info is forwarded to a time basis 41, whose output signals are conveyed to linkage devices 42 and 43, whose output signals are conveyed to a signal generation device 44.

As illustrated in FIGS. 3 and 4, a time condition and a voltage condition are thereby taken into account in the generation of actuating signal BRC for the braking chopper.

On the one hand, the braking chopper is activated when the voltage lies above threshold value U1 and is deactivated when it lies below threshold value U2.

U2 is smaller than U1.

Thus, when intermediate circuit U_ZK increases from zero, the braking chopper is activated only when U1 is exceeded. As soon as U2 is undershot, the braking chopper is always deactivated. After the activation of the braking chopper, a deactivation of the braking chopper takes place after a time period q×T at the latest. Time period T is the multiplicative inverse of the frequency specified for the braking chopper, e.g., 3 kHz, for example. The factor q has a value of between zero and one and is selected, for example, to be large. For example, it amounts to 0.95.

In addition, if activation threshold U1 had been reached at least once in the past and the intermediate circuit voltage U_ZK still lies above U2, the braking chopper is deactivated when time period T is reached that has elapsed since the previously implemented deactivation, and the braking chopper is activated when time period T since the previously executed activation has elapsed.

An effect of these voltage conditions and time conditions is that the braking chopper is always operated at the frequency f=1/T when it is in operation. It remains deactivated in the other case.

In this manner, no undesired oscillation is therefore excitable in the intermediate circuit by the operation of the braking chopper.

Even if—purely theoretically—different frequencies have non-vanishing amplitudes in the Fourier analysis of the time characteristic due to the finite operating period of the braking chopper, the energy introduction in the resonant frequency is too low to excite a dangerous or undesired oscillation.

A robust operation of the drive system with multiple inverters jointly supplied with a DC-voltage, and the avoidance of resonant oscillations and resonance increases are able to be obtained. In addition, a reduction of the loading of the components is able to be brought about because the AC-voltage component of the intermediate circuit current is reduced. In addition, no information about the actual intermediate circuit capacitance of the system is required. As a result, no control needs to be parameterized individually. Even a plug & play configuration is possible in this manner. Moreover, it is possible that inverters are retroactively able to be connected as well without requiring a reparameterization of the system. The hysteresis of the braking chopper automatically and correctly adjusts itself through the described control. However, the connection point of the brake resistor may also be implemented at different positions for this purpose.

LIST OF REFERENCE CHARACTERS 1 rectifier
2 signal electronics
3 inverter
4 controllable switch, in particular braking chopper
5 converter
20 inverter
21 rectifier
30 time basis
31 filter, in particular digital filter
32 serial-parallel converter
33 comparator with hysteresis
34 voltage monitoring for deactivation upon the detection of negative voltages
35 AND-conjunction
36 signal generation
37 first signal line
38 second signal line
39 linking device
40 voltage-dependent logic
41 controllable time basis, in particular controllable counter
42 linking device
43 linking device
44 signal generation device
50 excitation
Clk clock signal
BRC actuating signal for controllable semiconductor switch, in particular braking chopper
BRC_Info input signal for time basis 41
Ein_U_puls activation signal
Aus_U_puls deactivation signal
Sync synchronization signal
Load load signal
Koeff coefficient
Data Clock clock signal
U1 activation threshold
U2 deactivation threshold
R brake resistor
M electric motor
C capacitor
L inductance
L_ZK line inductance
C_ZK intermediate circuit-side capacitance of the respective inverter

What is claimed is:

1. A drive system, comprising:
a rectifier including a DC-voltage-side connection;
an inverter including an AC-voltage-side connection and a DC-voltage-side connection, the DC-voltage-side connection of the inverted connected to the DC-voltage-side connection of the rectifier via an inductance and a line inductance;
an electric motor connected to the AC-voltage-side connection of the inverter;
a capacitance connected to the DC-voltage-side connection of the inverter and/or at the DC-voltage-side connection of the rectifier; and
a series circuit, arranged as a braking chopper, that includes a resistor and a controllable semiconductor switch, connected to the DC-voltage-side connection of the inverter and/or at the DC-voltage-side connection of the rectifier; and
wherein the braking chopper is adapted to operate using a single frequency during a particular time span in which the braking chopper is operated, the single frequency being offset from a resonant frequency of a resonant circuit that includes the inductances and the capacitance.

2. The drive system according to claim 1, wherein the capacitance includes a non-polar capacitor and/or a film capacitor.

3. The drive system according to claim 1, further comprising a first digital filter and a second digital filter adapted to receive an acquired voltage value of a voltage supplying the series circuit and/or a voltage applied at the DC-voltage-side connection of the inverter, the second digital filter adapted to start at a time offset from the first digital filter.

4. The drive system according to claim 3, wherein the first digital filter and/or the second digital filter includes an FIR filter.

5. The drive system according to claim 3, wherein the time offset corresponds to one half of a filter length.

6. The drive system according to claim 3, further comprising a comparison device adapted to compare output signals of the first digital filter and the second digital filter with first and second threshold values, output signals of the comparison device being logically linked with a signal generated by a controllable time basis to generate an actuating signal for the braking chopper.

7. The drive system according to claim 6, wherein the controllable time basis includes a controllable clock generator.

8. The drive system according to claim 1, wherein the braking chopper is adapted to be deactivated in response to an intermediate circuit voltage dropping below a second threshold value, the intermediate circuit voltage being represented by a voltage that supplies the series circuit.

9. The drive system according to claim 8, wherein the braking chopper is adapted to be activated in response to the intermediate circuit voltage exceeding a first threshold value, first threshold value being greater than the second threshold value.

10. The drive system according to claim 9, wherein the braking chopper is adapted to be deactivated, if the first threshold is exceeded or reached at least once and an intermediate circuit voltage is above the second threshold value, in response to a time interval from a previously undertaken deactivation reaching a time interval whose value is equal to a product of a time period and a factor, the factor having a value of between zero and one.

11. The drive system according to claim 10, wherein the factor has a value of between 0.8 and 0.98.

12. The drive system according to claim 9, wherein the braking chopper is adapted to be activated, if the first threshold value is exceeded or reached at least once and an intermediate circuit value is above the second threshold value, in response to a time interval from a previously undertaken activation reaching a time interval whose value is equal to a product of a time period and a factor, the factor having a value of between zero and one.

13. The drive system according to claim 12, wherein the factor has a value of between 0.8 and 0.98.

14. The drive system according to claim 9, wherein the braking chopper is adapted to be deactivated, if the first threshold value is exceeded or reached at least once and an intermediate circuit voltage is above the second threshold value, in response to a time interval from a previously undertaken deactivation reaching a time interval whose value is equal to a product of a time period and a first factor, the first factor having a value of between zero and one;
wherein, the braking chopper is adapted to be activated, if the first threshold value is exceeded or reached at least once and an intermediate circuit voltage is above the second threshold value, in response to a time interval from a previously undertaken activation reaching a time interval whose value is equal to a product of a time period and a second factor, the second factor having a value of between zero and one; and
wherein the first factor equals the second factor.

15. The drive system according to claim 1, wherein the braking chopper is adapted to be activated in response to the intermediate circuit voltage exceeding a first threshold value, the intermediate circuit voltage being represented by a voltage that supplies the series circuit.

16. The drive system according to claim 1, wherein the braking chopper is adapted to be activated in response to an intermediate circuit voltage exceeding a first threshold value and in response to either no activation having had previously taken place or a most recent activation having previously taken place is earlier by more than a predefined time period that is equal to a multiplicative inverse of the single frequency, the intermediate circuit voltage being represented by a voltage that supplies the series circuit.

17. The drive system according to claim 1, wherein the braking chopper is adapted to be deactivated, following an activation of the braking chopper, after and/or no later than a time period having a value that is equal to a product of a time period and a factor, the factor having a value of between zero and one.

18. The drive system according to claim 17, wherein the factor has a value of between 0.8 and 0.98.

19. The drive system according to claim 17, wherein a multiplicative inverse of the time period is greater than the resonant frequency of the resonant circuit.

20. The drive system according to claim 1, wherein the inductance is at least ten times greater than the line inductance.

21. The drive system according to claim 1, wherein the inductance is at least one hundred times greater than the line inductance.

* * * * *